United States Patent [19]

Yamamoto et al.

[11] Patent Number: 5,229,822
[45] Date of Patent: Jul. 20, 1993

[54] PHOTOMETRIC UNIT FOR PHOTOGRAPHIC PROJECTOR-PRINTER ASSEMBLY

[75] Inventors: Takashi Yamamoto; Kazuhiko Katakura, both of Kaisei, Japan

[73] Assignee: Fuji Photo Film Co., Ltd., Kanagawa, Japan

[21] Appl. No.: 882,022

[22] Filed: May 13, 1992

[30] Foreign Application Priority Data

May 16, 1991 [JP] Japan .................................. 3-111492

[51] Int. Cl.$^5$ ........................ G03B 27/74; G03B 27/80
[52] U.S. Cl. ........................................ 355/68; 355/38
[58] Field of Search .............................. 355/68, 38, 67

[56] References Cited

U.S. PATENT DOCUMENTS

| | | | |
|---|---|---|---|
| 3,398,635 | 8/1968 | De Boer | 355/68 |
| 4,690,548 | 9/1987 | Holm | 355/68 |
| 4,707,120 | 11/1987 | Yamamoto | 355/38 |
| 4,728,996 | 3/1988 | Matsumoto | 355/68 |
| 4,866,475 | 9/1989 | Suzuki | 355/68 |

Primary Examiner—Monroe H. Hayes
Attorney, Agent, or Firm—Sughrue, Mion, Zinn, Macpeak & Seas

[57] ABSTRACT

The present invention provides a photometric unit designed for a photographic projector-printer assembly, which does not require a movable portion and is thus simple in its structure and eliminates any time lag in focal length change. The photometric unit 20 is diagonally offset with respect to the projection-side optical axis and has two area sensors 9 and 10 mounted in parallel with each other on a common substrate plate 8 and two image-formation lenses 11 and 12 having different focal lengths, which are located in operative association with the two area sensors. The optical axis a of one image-formation lens 11 having a longer focal length is positioned such that it intersects the optical axis of the projection optical path at a point O on the negative film, whereby a negative film image formed on either one of said area sensors depending upon the size of the image on said negative film is photoelectrically converted for photometry measurement.

9 Claims, 2 Drawing Sheets

PHOTOMETRIC UNIT FOR PHOTOGRAPHIC PROJECTOR-PRINTER ASSEMBLY

BACKGROUND OF THE INVENTION

The present invention relates generally to a photographic projector-printer assembly and, more particularly, to a photometric unit for providing photometric determination of the density and spectral distributions, etc. of negative film used with such a photographic projector-printer assembly.

In a photographic projector-printer assembly for projecting negative film held by a negative holder onto a photographic paper for photographic printing, the density and spectral distributions of the negative film, the absorption spectra of the base film, etc. are photometrically determined. So far, this has been done by inserting a reflecting mirror in front of (or on the object side of) the projecting lens to guide the light from the negative film to an area sensor and removing the reflecting mirror from the optical path during printing. Photometry has also been carried out with an area sensor located out of and diagonally above the optical path. When the negative film used is varied in size, the area to be photometrically determined is also changed, correspondingly. In the latter case, there is particular need of changing the focal length of the lens through which an image on the negative film is formed on the light-receiving surface of the area sensor. One conventional photometric unit is so constructed by using a single area sensor in combination with a single zoom lens that the focal length of the zoom lens can be varied whenever the negative film is varied in size, thereby changing the area to be photometrically determined. Another available photometric unit is made up of a single area sensor and a plurality of image-formation lenses with different variable focal lengths.

However, problems with such units using a single zoom lens or a plurality of image-formation lenses with variable focal lengths are that they do not only have a complicated structure and a large size due to including some movable portion, but there is also some time lag in changing the focal lengths.

Such problems might potentially be solved, if two photometric systems, each comprising a combination of a single area sensor with a single image-formation lens having a fixed focal length, are located off and diagonally above the optical path and either one of them is selectively used whenever negative film is varied in size. However, this solution would pose an assembly problem and need much more space, because the optical axes of the photometric systems must be separately located in alignment with the center of the negative film.

SUMMARY OF THE INVENTION

In view of such situations as mentioned above, an object of this invention is to provide a photometric unit for a photographic projector-printer assembly, which is located off and diagonally above the projecting optical axis at a given angle therewith and in which the area to be photometrically determined is changed whenever negative film is changed in size, wherein any movable portion is dispensed with to simplify its structure and eliminate any time lag in focal length change, making said unit easy to assemble.

According to this invention, the above-mentioned object is achieved by the provision of a photometric unit which is designed for a photographic projector-printer assembly adapted to project negative film through a projecting lens onto a photographic paper for photographic printing and which is located off and diagonally with respect to the projection-side optical axis from said negative film, characterized by comprising two area sensors mounted in parallel with each other on a common substrate plate and two image-formation lenses having different focal lengths, which are located in operative association with said two area sensors, the optical axis of one image-formation lens having a longer focal length being positioned such that it intersects the optical axis of the projection optical path on said negative film, whereby a negative film image formed on either one of said area sensors depending upon the size of the image on said negative film is photoelectrically converted for photometry.

In this case, it is desired that the optical axes of both the image-formation lenses be arranged substantially in parallel with each other with the area sensor in association with the image-formation lens having a longer focal length located on the optical axis thereof and the area sensor in association with the image-formation lens having a shorter focal length spaced away from the optical axis thereof. Each image-formation lens may be located either in parallel with or at a swings and tilts angle with the plane of the associated area sensor. It is further preferred that such a photometric unit be located on either one side of an operator's view window formed in the photographic projector-printer assembly, as seen frontways.

In accordance with another preferred embodiment of this invention, the photometric unit for a photographic projector-printer assembly may be two area sensors and two image-formation lenses having different focal length. The lenses are located on the same plane in operative association with the two area sensors. The optical axis of the image-formation lens having a longer focal length is positioned such that it intersects the optical axis of the projection optical path on negative film, whereby a negative film image formed on either one of the area sensors depending upon the size of the image on the negative film is photoelectrically converted for photometry.

The photometric unit of this invention which has two area sensors mounted in parallel with each other on a common substrate plate and two image-formation lenses having different focal lengths, which are located in operative association with the two area sensors. The optical axis of one image-formation lens has a longer focal length is positioned such that it intersects the optical axis of the projection optical path on the negative film, whereby a negative film image formed on either one of the area sensors depending upon the size of the image on said negative film is photoelectrically converted for photometry. Accordingly it is possible to detect the density and spectral distributions, etc. of the overall image with satisfactory accuracy and without making any mechanical adjustment even when the size of the image on the negative film is changed. There is no time lag in changing magnification as well, because it can occur instantaneously and stably due to the absence of any movable portion. In addition, not only can the photometric unit be easily incorporated in the photographic projector-printer assembly—because this is done merely by accurately positioning only the image-formation lens having a longer focal length, but space saving is achieved as well—because all the components are mounted on a single substrate plate.

Still other objects and advantages of the invention will be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the ensuing description, one preferred embodiment of the photometric unit for a photographic projector-printer assembly according to this invention will be explained with reference to the accompanying drawings.

Figure 1:
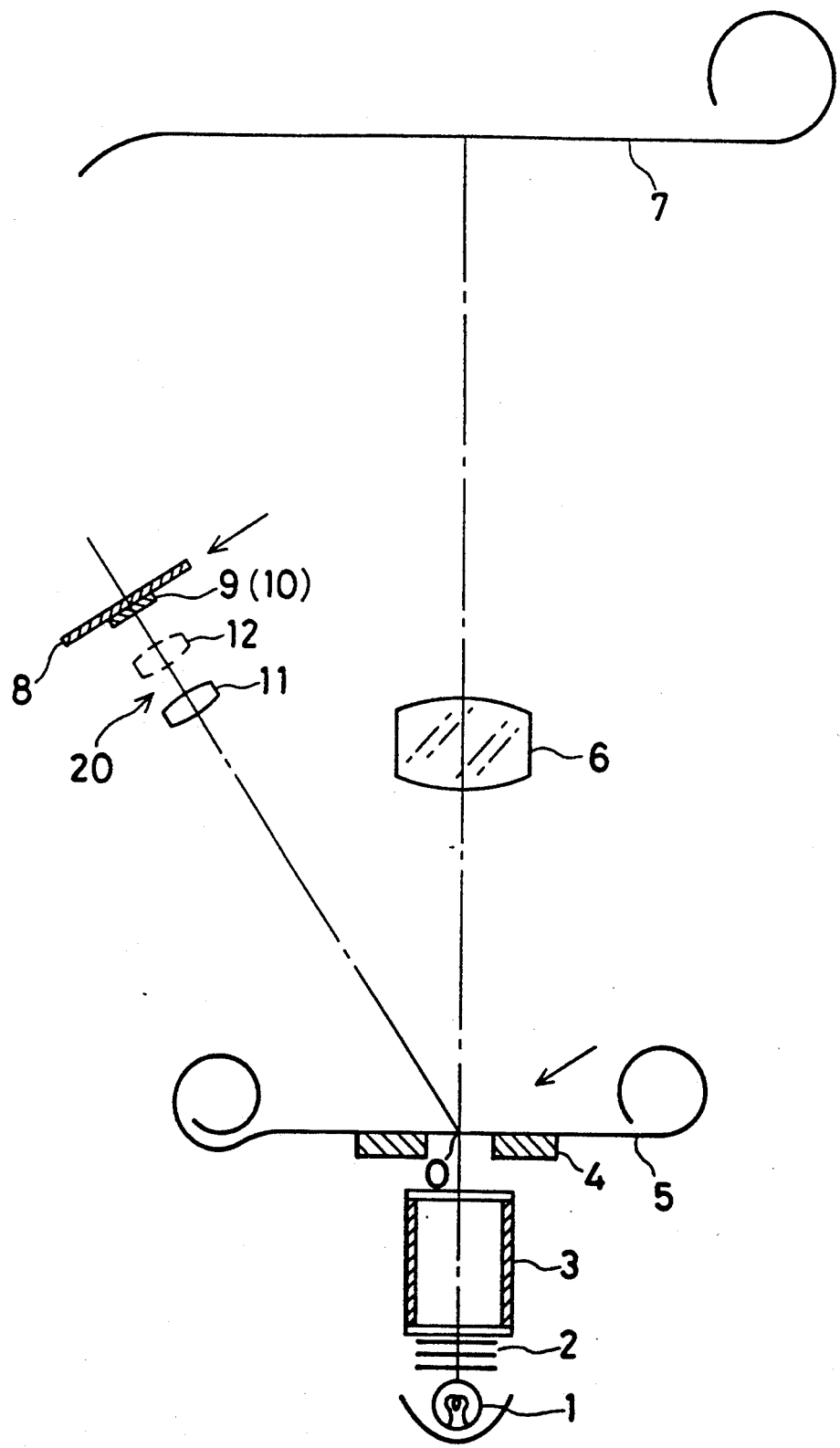
FIG. 1 represents a schematic arrangement of a photographic projector-printer assembly incorporating one embodiment of the photometric unit according to this invention.

FIG. 1 provides a schematic illustration of one photographic projector-printer assembly. As shown, this assembly is substantially made up of a white light source 1, a light-regulating filter 2 for regulating the spectral components of the light from the light source 1, a diffusing box 3 for diffusing and mixing the light passed through the filter 2 to illuminate negative film 5, a replaceable negative mask 4 having a rectangular opening corresponding to the size of an image on the negative film 5 and a projecting lens 6 for projecting an image on the negative film 5 fed on the negative mask 4 onto a photographic paper 7. In order to determine the density and spectral distributions of the image on the negative film, the absorption spectra of the base film, etc., a photometric unit according to this invention, shown generally at 20, is positioned out of and diagonally above the projecting optical path.

Figure 2:
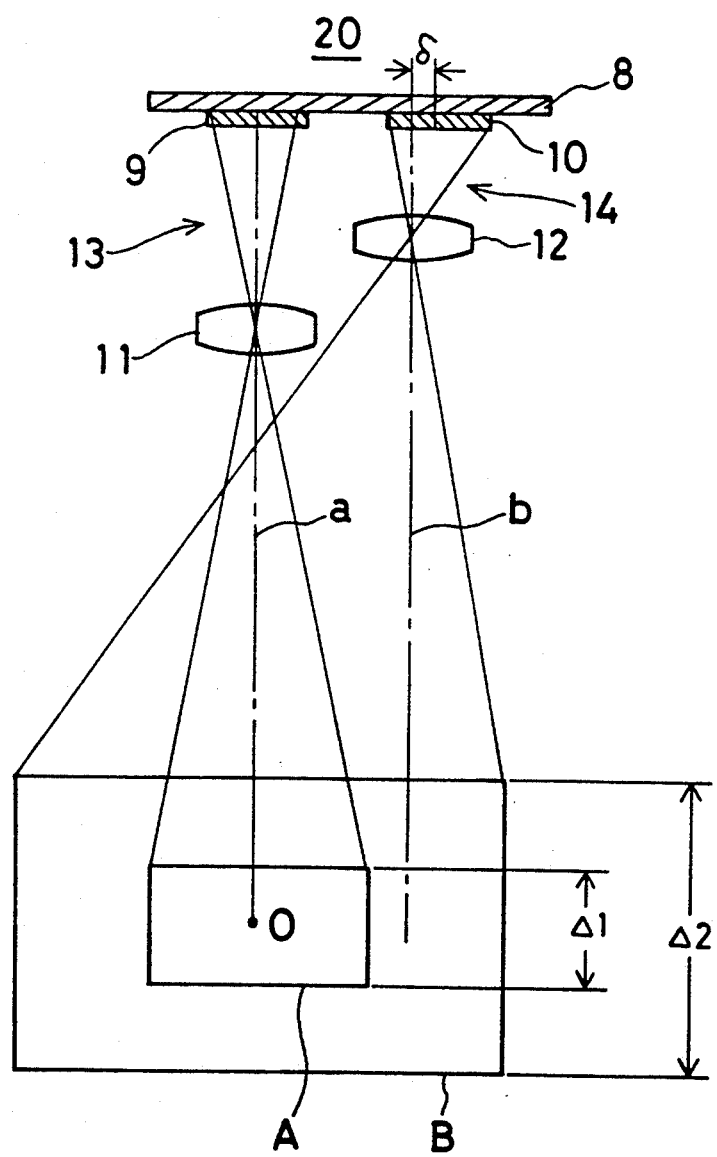
FIG. 2 is a view of the photometric unit of FIG. 1, as seen from the direction vertical to the optical axis.

FIG. 2 is a view of the photometric unit 20, as seen from the direction vertical to its optical axis, shown by an arrow in FIG. 1. The photometric unit 20 is substantially built up of two area sensors 9 and 10 mounted in parallel with each other on a common substrate plate, each comprising a solid-state image sensor such as a CCD, and image-formation lenses 11 and 12 with fixed focal lengths, which are positioned in operative association with the area sensors 9 and 10, one image-formation lens 11 has a focal length longer than that of the other lens 12. Here, photometric systems 13 and 14 are defined by an area sensor 9/image-formation lens 11 set and an area sensor 10/image-formation lens 12 set, respectively. Then, the optical axis a of the photometric system 13 intersects the negative film 5 at a point O, through which the optical axis of the projecting lens 6 passes. Specifically, the optical axis a of the photometric system 13 using the image-formation lens 11 having a longer focal length is located such that it intersects the optical axis of the photographic projector-printer assembly. By contrast, the optical axis b of the image-formation lens 12 having a shorter focal length does not intersect or, in other words, is spaced away from, that of the photographic projector-printer assembly, as can be best seen from FIG. 2.

The photometric unit 20 is constructed and positioned as described above; that is, when the size of the image on the negative film 5 is relatively small (as shown at A in FIG. 2), the overall image A is formed through the photometric system 13 using the image-formation lens having a longer focal length on the area sensor 9 for photometry. Since the optical axis a of the photometry system 13 passes centrally through the image A, the image A can be entirely formed on the area sensor 9 even through the image-formation lens 11 having a longer focal length and a smaller field angle. While the plane of the film 5 is not vertical to the optical axis a of the photometric system, the image A can be entirely formed on the area sensor 9; while in good focus, even through the image-formation lens has a longer focal length and a smaller depth of field, because the distance Δ1 between the farthest and nearest positions, because of the image being small, is shorter as compared with when the film size is large (Δ2 in FIG. 2). It is thus possible to detect the density and spectral distributions, etc. of the overall image with satisfactory accuracy. With negative film 5 of large size set in (as shown at B in FIG. 2), the photometric circuit is then operated by the photometric system 14, rather than by the photometric system 13. In the photometric system 14, the image-formation lens 12 has a wider field angle and a larger depth of field due to its shorter focal length. Thus, although the optical axis b does not pass centrally through the image B, it can be entirely covered by the image-formation lens 12 for image formation and the distance Δ2 between the farthest and nearest positions of the image B is allowed to lie within the depth of field. It is again possible to detect the density and spectral distributions, etc. of the overall image with an satisfactory accuracy. It is noted, however, that since the image B is formed by the image-formation lens 12 in an off-axial state, the area sensor 10 is spaced away from the optical axis b by a distance δ.

As described above, this invention provides a photometric unit designed to be located out of and diagonally above the projection optical path of a photographic projector-printer assembly, which has two area sensors mounted in parallel with each other on a common substrate plate and two image-formation lenses having different focal lengths, which are located in operative association with the two area sensors. The optical axis of one image-formation lens having a longer focal length is positioned such that it intersects the optical axis of the projection optical path on the negative film. When the size of an image on the negative film is smaller than a predetermined one (e.g., less than the full size of 135 type film), the light incident from the negative film is photoelectrically converted by the area sensor corresponding to the image-formation lens having a longer focal length for photometry. When the size of an image on the negative film is larger than that predetermined one (e.g., larger than 6×4.5 size of 120 type film), on the other hand, the light incident from the negative film is photoelectrically converted by the area sensor corresponding to the image-formation lens having a shorter focal length for photometry. Thus, if the photometric unit operates in association with the image-formation lens having a narrower field angle, a smaller depth of field and a longer focal length, then a film of smaller size with the center located on the optical axis is photometrically measured, and if it operates in association with the image-formation lens having a wider field angle, a larger depth of field and a shorter focal length, then a film of larger size with the center spaced away from the optical axis is photometrically measured. This enables films, whether smaller or large, to be detected with satisfactory accuracy in terms of the density and spectral distributions, etc. of the overall images thereon. Bear in mind that it is desired that the photometric unit according to this invention be arranged within the photographic projector-printer assembly on either side—as viewed frontways—of a view window, through which the operator sees the negative film 5 on the negative mask 4 from the outside, rather than in directly opposite the view window. The reason is that if the photometric unit is arranged within the projector-printer assembly in opposition on the view window, then external light entering it through the view window is regularly reflected off the film, causing the light to be incident on the photometric unit as noise light.

While this invention has been described specifically with reference to one embodiment, it is understood that the invention is not limited thereto and may be subjected to various modifications. For instance, the two image-formation lenses may be located on the same plane with the area sensors located on different planes rather than on the same plane. Also, the image-formation lenses may be positioned at an angle with, rather than in parallel with, the area sensors' planes as well. While the specific embodiment of the photometric unit according to this invention has been described as being applied to an inverted type photographic projector-printer assembly, it is appreciated that this invention is applicable to an upright type photographic projector-printer assembly as well.

According to the photometric unit for a photographic projector-printer assembly in accordance with this invention, which has two area sensors mounted in parallel with each other on a common substrate plate and two image-formation lenses having different focal lengths, which are located in operative association with the two area sensors. The optical axis of the image-formation lens having a longer focal length is positioned such that it intersects the optical axis of the projecting optical path on the negative film, whereby a negative film image formed on either one of said area sensors depending upon the size of the image on said negative film is photoelectrically converted for photometry. Accordingly, it is possible to detect the density and spectral distributions, etc. of the overall image with satisfactory accuracy and without making any mechanical adjustment even when the size of the image on the negative film is changed, as can be understood from what has been described. There is no time lag in changing magnification as well, because it can occur instantaneously and stably due to the absence of any movable portion. In addition, not only can the photometric unit be easily incorporated in the photographic projector-printer assembly-because this is done merely by accurately positioning only the image-formation lens having a longer focal length, but space saving is achieved as well-because all the components are mounted on a single substrate plate.

What is claimed is:

1. A photometric unit which is designed for a photographic projector-printer assembly adapted to project negative film through a projecting lens onto a photographic paper for photographic printing and which is located along an axis which extends, diagonally with respect to the projection-side optical axis, from said negative film, said unit comprising, two area sensors mounted in parallel with each other on a common substrate plate and first and second image-formation lenses, having different focal lengths from each other, which are respectively located in operative association with said two area sensors, said first image formation lens having a focal length which is longer than that of said second image-formation lens, the optical axis of said first image-formation lens being positioned such that it intersects the optical axis of the projection optical path on said negative film, whereby a negative film image formed on either one of said area sensors, depending upon the size of the image on said negative film, is photoelectrically converted for photometry.

2. A photometric unit for the photographic projector-printer assembly as claimed in claim 1, characterized in that the optical axes of both of said first and second image-formation lenses are located substantially in parallel with each other, the area sensor in operative association with said first image-formation lens has a central portion which is located on the optical axis thereof, and the area sensor in operative association with the image-formation lens has a central portion which is spaced away from the optical axis thereof.

3. A photometric unit for the photographic projector-printer assembly as claimed in claim 2, said photometic unit being located on one side of said projecting optical path as viewed through an operator's view window provided in said photographic projector-printer assembly.

4. A photometric unit for the photographic projector-printer assembly as claimed in claim 1, said photometric unit being located on one side of said projecting optical path as viewed through an operator's view window provided in said photographic projector-printer assembly.

5. A photometric unit for the photographic projector-printer assembly as claimed in claim 1 or 2, characterized in that said first and second image-formation lenses are disposed in parallel with the plane of the associated area sensor.

6. A photometric unit for the photographic projector-printer assembly as claimed in claim 5, said photometric unit being located on one side of said projecting optical path as viewed through an operator's view window provided in said photographic projector-printer assembly.

7. A photometric unit for the photographic projector-printer assembly as claimed in claim 1 or 2, characterized in that said first and second image-formation lenses are disposed at an angle with the plane of the associated area sensor.

8. A photometric unit for the photographic projector-printer assembly as claimed in claim 7, said photometric unit being located on one side of said projecting optical path as viewed through an operator's view window provided in said photographic projector-printer assembly.

9. A photometric unit which is designed for a photographic projector-printer assembly adapted to project negative film through a projecting lens onto a photographic paper for photographic printing, said unit being located along an axis which extends, diagonally with respect to the projection-side optical axis from said negative film, said unit comprising two area sensors and first and second image-formation lenses, having different focal lengths from each other, which are located on the same plane in operative association with said two area sensors respectively, said first image-formation lens having a focal length which is longer than that of said second image-formation lens, the optical axis of said first image-formation lens being positioned such that it intersects the optical axis of the projection optical path on said negative film, whereby a negative film image formed on either one of said area sensors depending upon the size of the image on said negative film is photoelectrically converted for photometry.

* * * * *